United States Patent [19]
Dower

[11] 3,994,176
[45] Nov. 30, 1976

[54] PNEUMATIC APPARATUS FOR MEASURING RATE OF MOVEMENT

[75] Inventor: Ethell J. Dower, Houston, Tex.

[73] Assignee: Warren Automatic Tool Co., Houston, Tex.

[22] Filed: Nov. 10, 1975

[21] Appl. No.: 630,322

[52] U.S. Cl. .................................. 73/506; 73/521
[51] Int. Cl.² .......................................... G01P 3/26
[58] Field of Search .......... 73/388 R, 432 CR, 506, 73/521, 523, 151.5, 502; 137/624.13, 624.15

[56] References Cited
UNITED STATES PATENTS 3,054,295  9/1962  Burner ............................ 73/423 CR

*Primary Examiner*—James J. Gill
*Attorney, Agent, or Firm*—Arnold, White & Durkee

[57] ABSTRACT

A pneumatic apparatus for measuring the rate of movement of one object with respect to another. A pneumatic signal functionally related to the displacement of the object whose rate is being measured is generated, differentiated and recorded. The apparatus is adapted to reset itself automatically if the rate exceeds a predetermined amount. The record produced by the apparatus may be a bar graph or a continuous curve reading directly in the rate of movement being measured.

6 Claims, 7 Drawing Figures

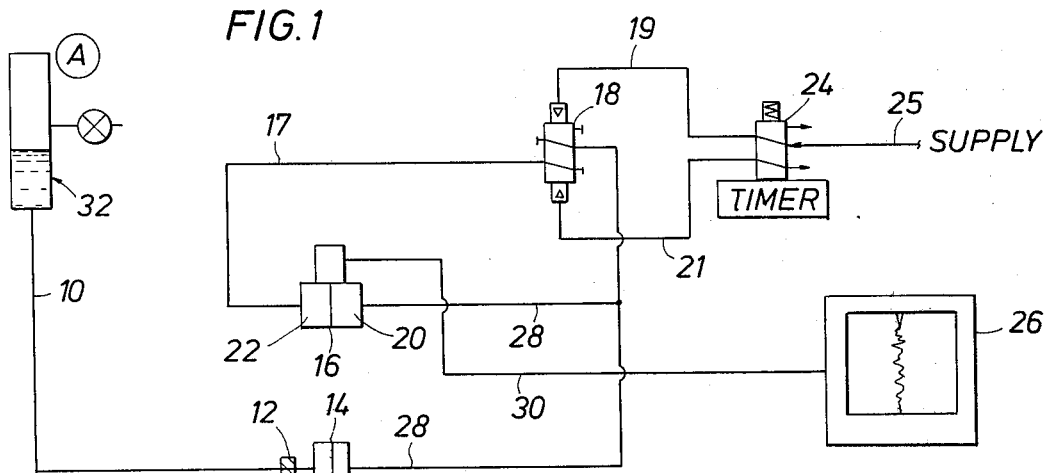
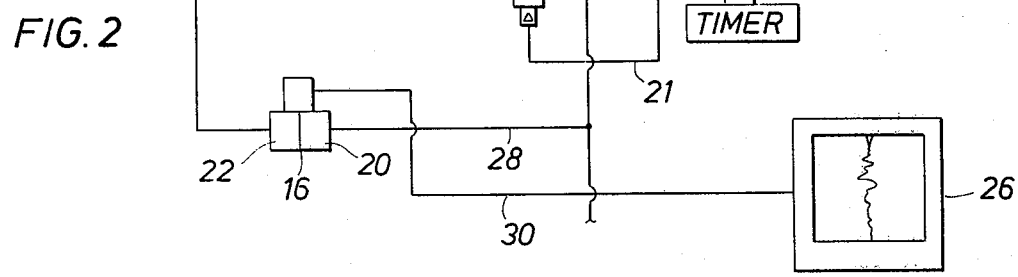
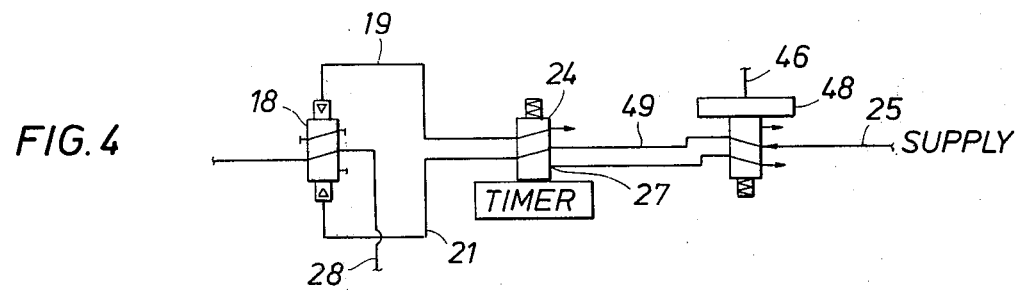
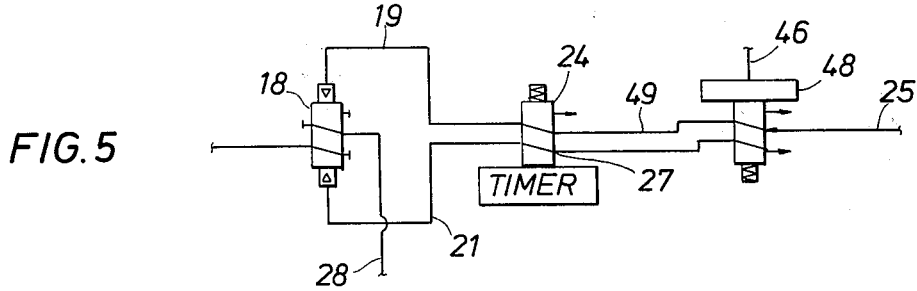
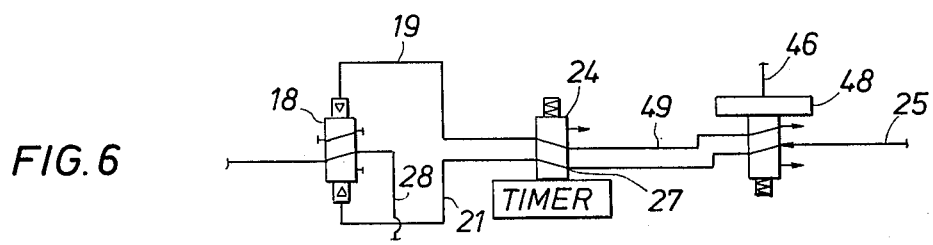

BAR GRAPH
RECORDING

CONTINUOUS
TRACE
RECORDING

PNEUMATIC APPARATUS FOR MEASURING RATE OF MOVEMENT

BACKGROUND OF THE INVENTION

This invention relates to a pneumatic apparatus for measuring the rate of vertical movement of one object with respect to another.

More particularly, this invention relates to a pneumatic apparatus for measuring and recording the rate of penetration of a drill bit as it proceeds downwardly during oil well drilling operations.

DESCRIPTION OF THE PRIOR ART

During the operation of many monitoring systems, it is common practice to measure the rate of movement of one object with respect to another. For example, in the oil and gas well drilling industry, it is desirable to continually monitor and record the rate of penetration of the rotary drill bit as it proceeds through the various formations of the earth. This rate is often used as a tool to determine the drilling efficiency under variable operating conditions and the nature and characteristics of the individual formations which assist in the evaluation of potential hydrocarbon bearing zones.

Since the rotary drive member or kelly of a rotary drilling rig is attached directly to the upper portion of the drill string, its vertical movement with respect to the derrick floor is equal to the movement or penetration of the drill bit. Thus, in the past various electromechanical and pneumatic devices have been used to measure and record the position and rate of movement of the kelly with respect to the derrick floor. One such instrument employs a liquid column to produce a hydraulic head pressure representative of the relative vertical displacement between the kelly and the derrick floor. This head pressure is recorded on a constantly advanced chart thus forming a graph of the position of the kelly at a designated time during operations. Such a chart showing only position is not in a form which is readily understandable, therefore, it is necessary in order to determine the drilling rate at a certain depth to manually calculate the slope of the curve produced by such an instrument at a particular point. Such manual differentiating has been found to be quite inefficient and produce inconsistent results.

Another instrument used in the industry utilizes an electromechanical device to record the amount of time required for the bit to penetrate one foot of formation. The chart is advanced by the displacement of the drill bit while the stylus is advanced at a constant speed thereby producing a record of the time per unit of displacement rather than displacement per unit of time. Again a chart is produced which is not readily understandable without additional calculations since such an output is the reciprocal of the normally utilized drilling rate expressed in feet per hour. Thus, the higher rates of penetration are indicated by small outputs or readings of the output device and therefore more difficult to read and possibly more erroneous due to the inherent inaccuracies in the lower operating ranges.

The third device also used is an electromechanical apparatus utilizing an electrical circuit to produce a chart of drill rate at specific depths of the well being drilled. Devices such as previously discussed are disclosed in patents such as those issued to Yeatman No. 2,230,280; Silverman No. 2,539,758; Green No. 3,017,770; Lubinski No. 2,688,871 and Storm No. 2,733,599.

Recognizing the need for an improved monitoring device, it would, therefore, be desirable to provide a fully pneumatic apparatus for producing a chart reading directly in penetration rate. Due to the adverse environments often encountered in the drilling industry, a fully pneumatic apparatus offers the advantages of safety and reliability without being dependent upon electric power.

SUMMARY OF A PREFFERRED EMBODIMENT OF THE INVENTION

It is therefore a general feature of this invention to provide an improved apparatus for measuring and recording the rate of vertical movement of one object with respect to another.

It is a particular feature of this invention to provide an assembly of the type utilizing a liquid column to sense the vertical movement of one object with respect to a second and produce a pneumatic output signal which is functional of the rate of movement of the first object with respect to the second.

It is also a feature of this invention to provide an improved apparatus for producing a record of the rate of penetration of a rotary drill bit during drilling operations which is readily understandable without additional calculations.

An apparatus according to a preferred embodiment of the invention intended to include some of the foregoing features, is utilized for measuring and recording the rate of vertical movement of a first object with respect to a second object. The apparatus includes a flexible pipe filled with liquid and having its upper end attached to the first object and its lower end attached to the second object, thus producing at its lower end a hydraulic pressure proportional to the vertical distance between the two objects. A converter is attached to the lower end of the flexible pipe which produces a first pneumatic signal functionally related to the hydraulic pressure at the lower end of the flexible pipe. This first pneumatic signal is communicated to a differential pressure transmitter having first and second chambers and capable of producing a second pneumatic signal functional of the pressure differential between these two chambers. The first chamber of the differential pressure transmitter continually receives the pneumatic signal from the converter. A differentiating valve is in communication with the second chamber and periodically communicates the first pneumatic signal to the second chamber in order to equalize the pressures between the first and second chambers otherwise the second chamber remains at a constant pressure equal to the previous equalization pressure of the first signal. The shifting of the differentiating valve is controlled by a timer valve. Thus, the differential pressure transmitter produces a pneumatic signal functional of incremental changes in the pressure differential between the first and second chambers which is in turn functionally related to the rate of vertical movement of the first object with respect to the second object. Certain embodiments may include an assembly to reset the apparatus when the rate of movement falls outside a predetermined range. Also, the apparatus may include an assembly for transforming the output signal into a pneumatic signal which reflects only changes in the rate of movement occuring between each measuring cycle of the apparatus.

Further embodiments may include the above mentioned apparatus in combination with a pneumatic device for producing a signal representative of the displacement of the object with respect to the second object or other relationships between the two objects.

BRIEF DESCRIPTION OF THE DRAWINGS

Reference to the drawings will further explain the invention, wherein like numerals refer to like parts, and in which:

FIG. 1 is a schematic diagram of a simplified embodiment of the pneumatic circuit apparatus of this invention with the differentiating valve in an off position.

FIG. 2 is the schematic diagram shown in FIG. 1 with the differentiating valve in an on position.

FIG. 4 is a schematic diagram of a portion of the circuit of FIG. 3 with differentiating valve in an on position and timer valve is a first position.

FIG. 5 is the schematic diagram of FIG. 4 with the differentiating valve in an off position and the timer valve in a second position.

FIG. 6 is the schematic diagram of FIG. 4 with control valve in a second or reset position.

DETAILED DESCRIPTION

Figure 3:
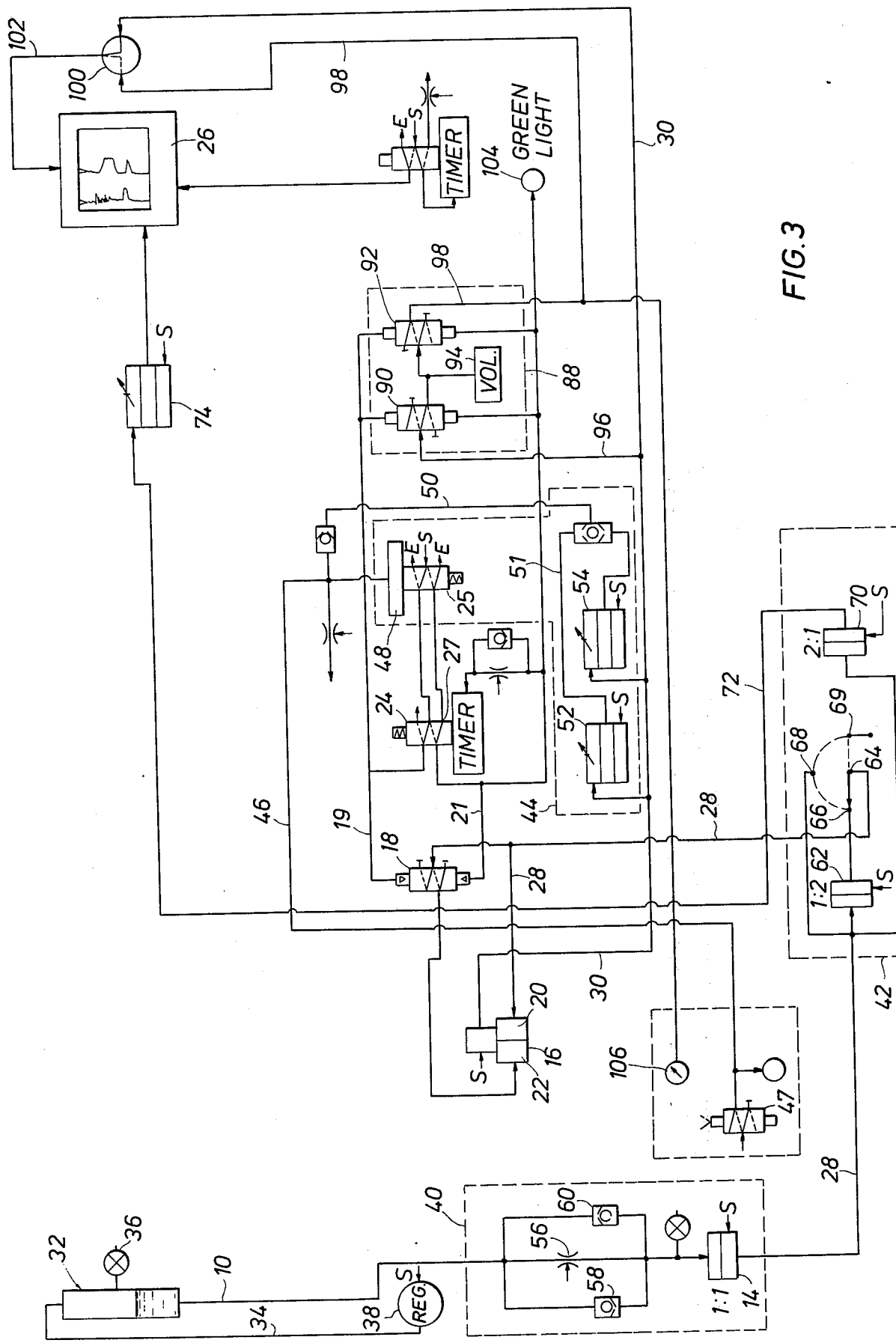
FIG. 3 is a detailed schematic diagram of one embodiment of the pneumatic circuit apparatus of this invention.

The following description is directed toward the use of the subject invention in connection with an oil well drilling rig, but it should be understood that such application is given only as an example. The subject invention is equally adaptable for use in any system where it is desired to measure the rate of vertical movement of one object with respect to another such as the liquid level of a tank and the bottom of a tank in order to determine the fluid rate into and out of the tank.

Referring now to FIG. 1, a fluid reservoir in the form of a flexible pipe 10 containing fluid or liquid is shown carried by first object A located above object B, the rate of vertical movememnt of A with respect to B being that which is to be measured and recorded by the present invention. The lower portion of pipe 10 is carried by object B at point 12. Since pipe 10 contains a liquid such as water, alcohol or a mixture of the two, the hydraulic head pressure at the lower portion of the liquid column at point 12 will be functionally related to the height of this column and the vertical distance between object A and B. Thus, as object A moves in a vertical direction the hydraulic head pressure produced by the liquid column changes correspondingly. This hydraulic head pressure is sensed by converter 14 which transmits a pneumatic signal functional of this head pressure to differential pressure transmitter 16 and differentiating valve 18. A portion of this pneumatic signal, which varies with the vertical movement of object A with respect to B, is continually received by first chamber 20 of differential pressure transmitter 16 with a second portion of the first pneumatic signal going through valve 18 and then to second chamber 22 of differential pressure transmitter 16. In order to selectively transmit the pneumatic signal to chamber 22 and periodically equalize the pressure between chambers 20, 22, timer valve 24 is connected to valve 18 by lines 19 and 21 and pneumatically shifts valve 18 at regular predetermined time intervals.

Thus in operation, chamber 20 is maintained at a pressure continually representative of the vertical position of object A and the hydraulic head pressure at point 12. The amount of change in position over a definite time period, i.e., the rate of vertical movement, can be monitored by a periodic measurement of the increase of pressure of chamber 20 over the pressure of chamber 22. This measurement, is for example, taken every minute by the action of valves 18 and 24. Timer valve 24 controls the action of differentiating valve 18 such that the pneumatic signal which is continually communicated to chamber 20 is also communicated to chamber 22 for about 5 seconds between each time period. FIG. 2 shows valves 18, 24 in the on or equalizing position. During this 5 second non-measuring period the pressures of chambers 20 and 22 are equalized and during the 60 second measuring cycle, pressure within chamber 20 fluctuates with the movement of object A and the pressure within chamber 22 remains constant at the value obtained during equalization. Thus, incremental changes in the pressure differential developed between chambers 20 and 22 are functionally related to the amount of vertical movement of A with respect to B, during that 60 second interval of time. Although the measuring cycle may be adjusted from 30 seconds to 120 seconds, depending upon the rate being observed, the 5 second equalizing period is kept constant.

To monitor the rate of movement of A, the steps of equalizing the pressure between chambers 20 and 22 and subsequently retaining the pressure in one chamber while allowing the other to fluctuate with the movement of A are repeated during the time interval being observed. Differential pressure transmitter 16 is adapted for producing a second pneumatic signal functionally related to the pressure differential between chambers 20, 22. Thus, the signal produced by differential pressure transmitter 16 is a cycling signal returning to its minimum value during the equalization period with its maximum value reflecting the pressure differential reached between chambers 20 and 22 during each measuring interval and therefore the rate of movement of object A with respect to object B for each cycle.

This pneumatic signal is transmitted to recorder 26 where a curve 82 is formed. (See FIG. 7) The chart is advanced at a predetermined rate with the stylus of the recorder moving in proportion to the magnitude of the pneumatic signal received from the differential pressure transmitter 16 during each 60 second period. Thus, a large change in vertical displacement during a given one minute cycle will produce a large pressure differential between chambers 20, 22 and a large signal will be generated by differential pressure transmitter 16 which in turn causes a large movement of the stylus of recorder 26. Thus, the above cycle of events creates a bar graph type chart which can be read directly without additional calculations to determine the rate of movement of A with respect to B.

A clearer understanding of the present invention will be had from a more detailed explanation of the different elements of FIG. 1. Flexible pipe 10, secured to object A, produces a hydraulic head pressure representative of the vertical distance between A and B. This hydraulic pressure is transformed to a functionally related pneumatic signal by converter 14 attached to B. Applicant has found that the pneumatic booster relay manufactured by Moore Products Company of Spring House, Pennsylvania, bearing Model No. 61F performs satisfactorily to terminate the liquid column of pipe 10 and transmit a functional pneumatic signal. This pneumatic signal is transmitted through line 28 to differential pressure transmitter 16 and differentiating valve 18. Transmitter 16 is a standard pneumatic differential pressure measurement device having a first chamber 20 and second chamber 22, the pneumatic signal from converter 14 being communicated directly to chamber 20. Transmitter 16 produces a second pneumatic signal which is communicated by line 30 and is functionally related to the difference in the pneumatic pressure existing within chambers 20, 22. A suitable such transmitter is manufactured by the Foxboro Company of Foxboro, Massachusetts, Model No. 13 which produces a continuous 3–15 p.s.i. signal related to the differential pressure observed.

Differentiating valve 18, a two position pneumatic valve, also receives the pneumatic signal from converter 14 by line 28. In the "off" position of valve 18, shown in FIG. 1, the pneumatic signal of converter 14 is not communicated to transmitter 16. In its "on" position as seen in FIG. 2, the pneumatic signal passes through valve 18 to line 17 and chamber 22 of transmitter 16. Valve 18 is shifted between its "on" and "off" positions by the action of timer valve 24, as will be discussed in more detail later. During a typical one minute cycle of the apparatus, valve 18 occupies its "on" position for 5 seconds and its "off" position for 60 seconds. Such shifting periodically equalizes the pressure between chambers 20, 22 during the 5 second interval and maintains that pressure value in chamber 22 for 60 seconds until the next 5 second equalizing period. During the one minute cycle, chamber 20 is in continuous communication with line 28 and thus its pressure changes as a result of movement of object A. Since chamber 22 is maintained at a constant pressure during the "off" cycle, such movement of A creates a pressure differential between chambers 20 and 22. The magnitude of this pressure differential is dependent upon the amount of movement of object A during this increment of time, therefore, is functional of the speed or rate of movement during this time period. The above described cycle is repeated every time interval during operation of the apparatus. Thus, only the change in elevation during each cycle is observed which therefore produces a series of pneumatic pulses to form a pneumatic signal in line 30 representative of the speed of object A with respect to B.

Referring back to FIG. 1, the pneumatic signal generated by transmitter 16 into line 30 is communicated to recorder 26. Recorder 26 is adapted for receiving this signal and producing a curve or graph in response thereto. The chart advances at a predetermined rate which allows a line to be transcribed on the chart during each cycle, the line being in proportion to the maximum pressure differential created within transmitter 16 during the 60 second portion of the cycle. Thus, the chart can be calibrated in feet per hour and the rate of movement or speed of the object being measured can be read directly from the chart.

Referring now to FIG. 3, a more detailed and sophisticated embodiment of the apparatus of this invention will be described. This embodiment is directed to utilization with a rotary drilling rig commonly used for drilling oil wells but it can be appreciated that it may also be adapted for other uses.

The upper portion of flexible pipe 10 is carried by the upper portion of the kelly which moves vertically in unison with the drill bit (not shown). At the upper most portion of pipe 10 is connected a sealed liquid tank or reservoir 32 partially filled with a liquid and a pneumatic line 34 connected to the upper portion of tank 32. Line 34 has been added to maintain a pressure level above normal atmospheric in the upper portion of tank 32 thereby preventing vaporization of the liquid as the kelly reaches its extreme position during drilling operations. For calibration purposes applicant has found that satisfactory results are achieved when the liquid contained within tank 32 and line 10 is a mixture of 50% alcohol and 50% water by volume. Relief valve 36, in pressure communication with the upper portion of tank 32, is utilized for control of the air pressure within tank 32. Air is supplied to line 34 by regulated gas supply 38.

As previously described flexible pipe 10 and tank 32 are mounted for movement with the kelly of the drilling rig. Since the kelly is attached directly to the upper end of the drill string, it moves in a vertical direction with displacement and rate equal to that of the drilling bit. Thus, as liquid tank 32 is lowered by the downward movement of the kelly, the hydraulic head pressure produced by the liquid column within liquid tank 32 and pipe 10 is functional of the movement of the kelly and thus of the drill bit.

Enclosed within dotted line 40 is an assembly of surge valves in communication with flexible pipe 10. This assembly is used to prevent rapid surges and erroneous results when the kelly is rapidly moved in the vertical direction, such as during pipe pulling operations. A detailed explanation of the apparatus enclosed within dotted line 40 is given below.

As previously discussed converter 14 is in communication with the lower portion of pipe 10 and adapted for receiving the hydraulic head pressure produced by the liquid column and producing a functionally related pneumatic signal in line 28. In the typical drilling operations it has been found that when the alcohol-water mixture previously disclosed is used, converter 14 may operate at a 1 to 1 ratio for acceptable results.

The pneumatic signal produced by converter 14 is communicated by line 28 through scale selector assembly, shown within dotted line 42, to differential pressure transmitter 16 and differentiating valve 18. Scale selector assembly 42 is utilized to multiply the signal from converter 14 by an appropriate amount such that a convenient scale may be selected for recorder 26. Greater detail of selector assembly 42 is given below.

As was previously described, transmitter 16 and differentiating valve 18 receive a pneumatic signal from line 28 and produce a second pneumatic signal in line 30 corresponding to incremental changes in the movement of the kelly. Greater automatic control of the apparatus shown in FIG. 1 can be obtained by interposing a shutdown assembly (enclosed within dotted line 44 in FIG. 3) between timer valve 24 and the pneumatic supply 25. Shutdown assembly 44 operates to selectively supply the pneumatic fluid to timer valve 24 during operation of the apparatus. Upon an "off" signal from the rig operator, such as producing a pneumatic signal in line 46 by operation of switch 47, or the production of a pneumatic signal in line 30 having a magnitude outside a predetermined range, the shutdown assembly 44 diverts the fluid supply 25 to a second port 27 of timer valve 24 until normal operating conditions are restored or the apparatus is reset for a second cycle.

A more detailed description of the operation of assembly 44 can be seen from FIGS. 4, 5 and 6. In its normal operating position, see FIGS. 4 and 5, control valve 48 communicates pneumatic fluid to timer valve 24 through line 49 allowing timer 24 to shift between its "on" position of FIG. 4 and its "off" of FIG. 5. Upon receiving a pneumatic signal from the operator of the rig through line 46 (FIG. 3) or an "off" scale signal from line 50, control valve 48 shifts to its second position as seen in FIG. 6 where the pneumatic supply is communicated to port 27 and through timer valve 24 to shift differentiating valve 18 to its equalizing position thereby equalizing chambers 20, 22 and returning the apparatus to the beginning of a new measuring cycle. As long as the operator maintains control valve 48 in the position shown in FIG. 6 by the use of switch 47, there will be no differential pressure created between chambers 20, 22 and the signal in line 30 from differential pressure transmitter 16 will be a minimum value and thus be recorded as a zero value on recorder 26. The reset position shown in FIG. 6 is utilized when the kelly is being raised or lowered rapidly during pipe pulling operations since there is no need to record the rate of penetration. Applicant has found that an appropriate valve to be used as control valve 48 is a 4-way single diaphragm operated valve manufactured by Scovil Mfg. Co, of Wake Forest, North Carolina bearing Schradener No. 41062-1000.

Returning to FIG. 3, the "off-scale" pneumatic signal of line 50 is produced by a pair of pneumatic relays 52, 54. Each relay is in pressure communication with line 30 and arranged to selectively generate a shutdown pneumtic signal in response to the pressure value of the signal in line 30. High scale relay 52 is arranged to generate a pneumatic signal if the signal pressure in line 30 exceeds a predetermined pressure such as 15 p.s.i. The signal thus generated is transferred by lines 51 and 50 to control valve 48 which shifts to its reset position shown in FIG. 6 in response thereto. This reset position of valve 48 causes differentiating valve 18 to shift and equalize the pressure of chambers 20 and 22 and thereby decrease the pneumatic signal within line 30 to below 15 p.s.i. This decrease causes relay 52 to return to its normal position and allows control valve 48 to shift back to its operating position shown in FIG. 4 and 5.

Low relay 54 acts in a similar manner when the pneumtic signal in line 30 falls below a predetermined pressure such as 3 p.s.i. to cause valve 48 to shift to its reset position and shift differentiating valve 18 to its equalizing position and begin a new cycle. Thus, the combination of relays 52 and 54 are arranged to terminate a measuring cycle of the apparatus when the output signal is outside a predetermined range. Applicant has found that pneumatic relays manufactured by Moore Products of Spring House, Pennsylvania and identified as Model 67R and 67 function properly as relays 52 and 54 respectively.

Returning to FIG. 3, a surge valve assembly enclosed within dotted line 40 is connected to flexible pipe 10 between converter 14 and liquid tank 32. Surge valve assembly 40 includes dampening valve 56 connected in line of pipe 10 and adapted to dampen rapid pressure surges below a predetermined value arising in line 10 during normal monitoring operations. A pair of surge relief valves 58, 60 are influid communication with pipe 10 and form bypass loops across dampening valve 56. Relief valve 60 is arranged to pass excessively large pressure surges arising above dampening valve 56 which exceed the predetermined limit of dampening valve 56. Surge relief valve 58 is similarly arranged to bypass to the upper portion of pipe 10 excessively large pressure surges formed in the lower portion of pipe 10 below dampening valve 56. Thus in operation, the combination of dampening valve 56 and surge relief valves 58, 60 has the effect of dampening pressure surges formed by short term rapid movement of the kelly during operation until the amount of the movement exceeds a predetermined amount at which time the rapid surges are communicated directly through the surge assembly 40 with little dampening. During normal drilling operations, dampening valve 56 functions to dampen surges to converter 14 but during hoisting operations when drill pipe is being rapidly run into and out of the wellbore, valves 58, 60 bypass dampening valve 56 to allow full communication of the surges to the converter 14 and thus enable proper functioning of differential pressure transmitter 16.

In addition to the elements described above, the present invention may include scale selector assembly shown within dotted line 42 of FIG. 3. Selector assembly 42 may be inserted into line 28 to allow the operator to modify the pneumatic signal from converter 14 if the rate of penetration of the drill bit does not produce an output signal which can be readily read on the scale of recorder 26. For example, if the apparatus is calibrated such that the maximum pressure signal produced in line 30 by differential pressure transmitter 16 is to represent 60 feet per hour but the actual drill rate is 100 feet per hour, high scale relay 52 will reset the apparatus as previously described before a true indication of the rate is obtained. Thus, it is necessary to be able to recalibrate the instrument for different working conditions.

To modify the output of converter 14, booster 62 is connected to receive the signal from line 28 and amplify it, for example by a factor of 2. Selector assembly 42 also includes 3 position selector switch 64 which allows the operator to pass the signal of line 28 through booster 62 or to bypass booster 62. Thus, in normal operation the basic interval of time for rate measurement is one minute, this time interval being established by adjustment of timer valve 24. Recorder 26 is adjusted such that it will record a reading of 60 feet per hour as a full scale reading, i.e., maximum pneumatic pressure output of differential pressure transmitter 16. Hence, as selector switch 64 is connected to point 66 of line 28 as shown in FIG. 3 the signal from convertor 14 will be amplified by a factor of two and thus one foot of kelly movement occuring in one minute will drive the recorder 26 up to the full scale mark indicating a rate of 60 feet per hour. Likewise, if the kelly moves only one half foot in a one minute interval the recorder will only reach one half a full scale reading indicating a rate of penetration of 30 feet per hour. For drilling rates exceeding 60 feet per hour timer valve 24 can be set for 30 seconds and this point on the scale of recorder 26 can be marked 120 feet per hour at full scale. Also, if the drilling rate exceeds 120 feet per hour the selector switch 64 can be connected to point 68 where the input signal from line 28 is not multiplied by 2 so full scale on the recorder 26 is then 240 feet per hour. Also, in slower drilling rates selector switch 64 may be connected to point 66 with timer valve 24 set for two minute intervals thus the full scale position of recorder 26 would equal to 30 feet per hour for full scale.

Also, in the operating conditions where the rate of penetration is changing so rapidly that the output of recorder 26 is difficult to read, a longer time interval such as two minutes may be established by timer valve 24 and a selector switch 64 connected to point 68 thereby producing a 60 feet per hour full scale reading of recorder 26 but each reading or bar produced on the graph of recorder 26 will be the average of 2 minutes rather than one minute intervals.

Selector switch 64 may also be placed in communication with point 69 which may be connected to a controlled pneumatic fluid supply thereby enabling the calibration of the differential pressure transmitter 16.

Figure 7:
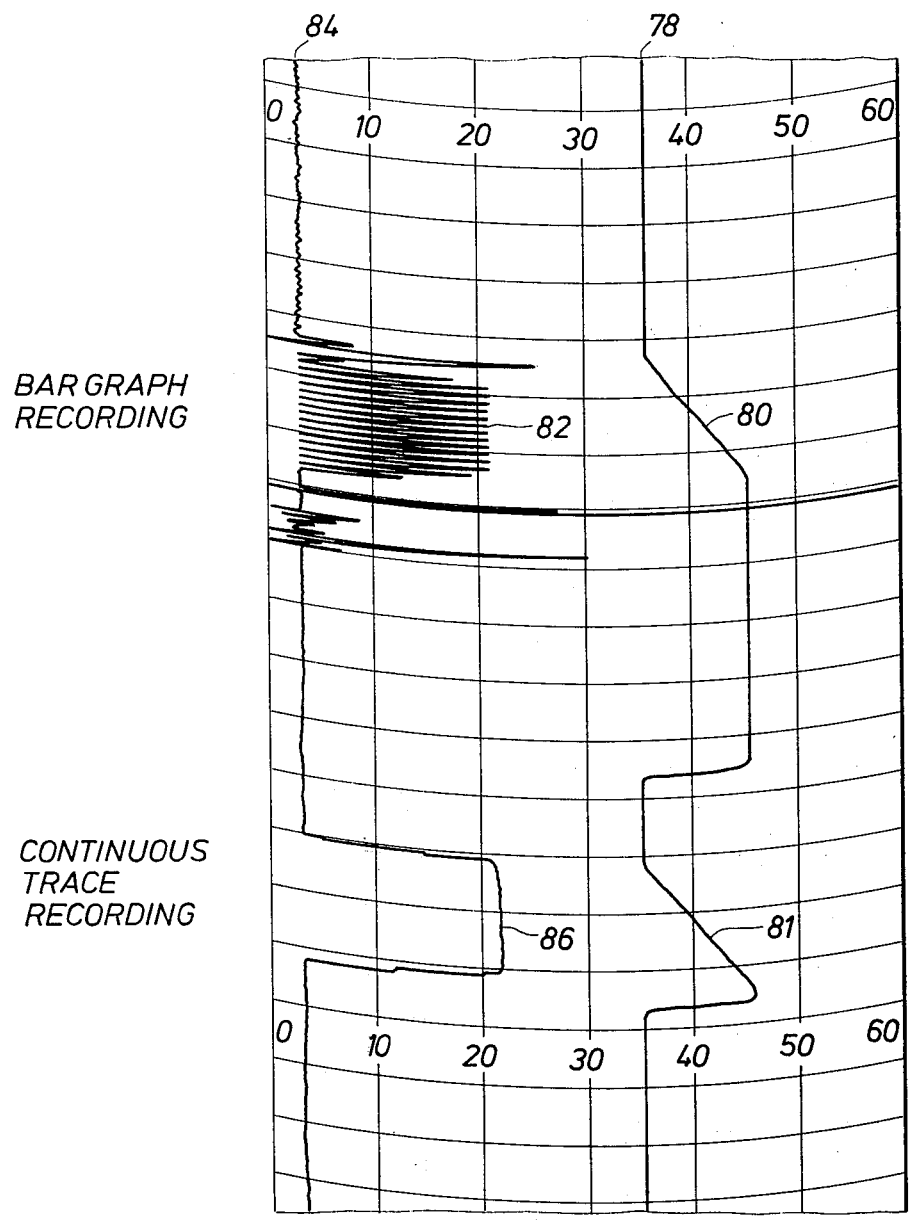
FIG. 7 is a face view of a recording chart containing rate of movement curve and displacement curve.

The present invention may also be adapted for producing a second curve on a chart of recorder 26 which indicated the position of the kelly during drilling operations. Such a chart can be produced directly from the pneumatic signal of converter 14 without the necessary differentiating for determining the rate of penetration. To record such a signal displacement booster 70 is connected to line 28 and produces a signal in line 72 which is communicated to recorder 26. Typically booster 70 and bias relay 74 are needed to modify the initial pneumatic signal in order to accomodate commercially available recorders. The production of a displacement curve together with a rate of penetration curve on a single chart has been found to be very useful by many operators. A typical chart produced by the present invention adapted for producing both a rate of penetration curve and a displacement curve is seen in FIG. 7. Curve 78 reflects the displacement of the kelly with respect to the floor of the derrick. That portion of curve 78 having a positive slope, designated 80, reflects vertical movement of the kelly with respect to the derrick floor. As can be seen by the bar graph section 82 of curve 84 the instrument recorded a constant rate of penetration of approximately 21 feet per hour during the same interval that is reflected by portion 80 of curve 78.

Often times during drilling operations the rate of penetration changes rapidly and produces a bar graph similar to portion 82 of curve 84 in FIG. 7 but which is difficult to read due to the closeness and large variations in magnitude of the individual bars. In such a situation the present invention may be adapted for producing a continuous curve which does not cylce from zero to the measured value during each time interval but produces a continuous step-like curve reflecting only increases or decreases in penetration rate from the previous cycle. The curve produced by this embodiment of the present invention is seen in portion 86 of curve 84, portion 81 of curve 78 also reflecting vertical displacement of the kelly concurrently with the measured rate of penetration.

In order to convert the pneumatic signal generated by differential pressure transmitter 16 which is characterized by a series of pneumatic pulses, each pulse lasting for a predetermined time period, into a continuous pneumatic signal capable of producing a continuous step-like curve, signal assembly, enclosed within dotted line 88 (see Fig. 3), is connected to lines 19, 21 and adapted for receiving the pneumatic signals transmitted by timer valve 24 to differentiating valve 18. Signal assembly 88 includes signal valves 90, 92, accumulator 94 may be connected between valves 90, 92 and take the form of an enlarged pipe connection or tank. Signal valves 90, 92 are connected to lines 19, 21 such that they are shifted in unison with differentiating valve 18 (see FIG. 3). Signal valve 90 is also connected to line 30 by line 96 to receive the pneumatic signal produced by differential pressure transmitter 16 and selectively transmit this signal to accumulator 94. Accumulator 94 is also connected to signal valve 92 which transfers the pressurized pneumatic fluid within accumulator 94 to recorder 26.

With the apparatus thus prepared and differentiating valve 18 in the position shown in FIG. 3, line 19 is pressurized by timer valve 24 thereby retaining differentiating valve 18 in its "off" position. Since line 19 is pressurized, signal valves 90, 92 are also maintained in the position shown in FIG. 3 thereby allowing the pneumatic signal from line 30 to pass into lines 96 through signal valve 90 since it is in its on position and pressurize accumulator 94. Signal valve 92 being in its closed or off position (shown in FIG. 3) the pneumatic fluid is retained within volume tank 94 and changes correspondingly with the pneumatic signal generated by differential pressure transmitter 16. As timer valve 24 shifts to its second position shown in FIG. 4, line 21 is pressurized, thereby shifting differentiating valve 18 to its "on" position as shown in FIG. 4. Since signal valves 90, 92 are also connected to line 21, they shift in unison with differentiating valve 18, valve 90 shifting to its off position and valve 92 shifting to its on position. Such shifting of valve 90 interrupts pressure communication between line 96 and accumulator 94 and establishes similar pressure communication between accumulator 94 and line 98 leading to recorder 26. Thus, when mode selector switch 100 is in the position connecting lines 98 and 102 (see FIG 3), the pneumatic output signal of differentiating valve 16 is transmitted through signal assembly 98 where signal valves 90, 92 shift to pressurize accumulator 94 during the "off" portion of the cycle and transmit this stored pneumatic pressure to recorder 26 during the "on" portion of the cycle without substantially decreasing the pneumatic pressure within accumulator 94. Accumulator 94 is allowed to decrease its pressure or "bleed down" back through valve 90 in the initial portion of the "off" cycle in order to allow repressurization during the "off" portion of the measuring cycle.

Thus, when the operator elects to utilize the signal assembly 88, lines 98, 102 are continually pressurized, thus preventing recorder 26 from returning to a zero position and forming series of pneumatic pulses or a cyclic signal. During the "off" portion of the measuring cycle the pressure is retained within lines 98, 102 by the blocking action of valve 92 while accumulator 94 is being pressurized by the pneumatic signal from differential pressure transmitter 16. Since the volume of accumulator 94 is large in comparison to the volume of lines 98, 102 the pressure within lines 98, 102 substantially equals that pressure created in accumulator 94 when signal valve 92 shifts to its second position thereby connecting accumulator 94 and line 98.

It has also been found that timer valve 24 may be conveniently calibrated by use of a pneumatic indicator 104 connected to line 21. The operator may manually time the period which time valve 24 pressurizes line 21 and thereby insure that time valve 24 is functioning properly to shift differentiating valve 19 between its "on" and "off" positions. Also, it may be convenient that a pressure gauge 106 be connected to line 98 and located adjacent switch 47 to enable the operator to continually determine without examination of the recording chart the rate of penetration of the drill bit.

It will thus be observed that this invention provides an apparatus for measuring and recording the rate of penetration of a drill bit during drilling operations and eliminates the mental calculations heretofore utilized in some instances and give an easily read and understood chart at all times.

Further modifications and alternative embodiments of the apparatus of this invention will be apparent to those skilled in the art in view of this description. Accordingly, this description is to be construed as illustrative only and is for the purpose of teaching those skilled in the art the manner of carrying out the invention. It is to be understood that the forms of the invention herewith shown and described are to be taken as the presently preferred embodiments. Various changes may be made in the size, shape and arrangement of parts. For example, equivalent elements or materials may be substituted for those illustrated and described herein, parts may be reversed, and certain features of the invention may be utilized independently of the use of other features, all as would be apparent to one skilled in the art after having the benefit of this description of the invention.

I claim:

1. An apparatus for measuring and periodically displaying the rate of vertical movement of a first object with respect to a second object comprising:
    a flexible pipe having its upper portion carried by said first object and its lower portion carried by said second object, said pipe containing a liquid whereby a liquid column if formed having a hydraulic pressure at its lower portion functionally related to the vertical distance between said first and second objects;
    a converter for sensing said hydraulic pressure and transmitting a first pneumatic signal functional of said hydraulic pressure;
    a differential pressure transmitter defining a first chamber for continually receiving said first pneumatic signal and second chamber, said transmitter producing a second pneumatic signal functionally related to the pressure differential between said first and second chambers;
    a differentiating valve in communication with said second chamber for periodically equalizing the pressure between said first and second chambers;
    a timer valve in communication with and selectively activating said differentiating valve whereby incremental changes in the pressure differential between said first and second chambers are functional of the rate of vertical movement of said first object with respect to said second object;
    a signal assembly in communication with the timer valve for transforming the second pneumatic signal characterized by a series of pneumatic pulses into a continuous pneumatic signal functional of the rate of vertical movement being monitored, said signal assembly including
    a first signal valve selectively interrupting the transmission of the second pnuematic signal by shifting between an on and off position in response to the output of the timer valve; and
    a second signal valve communicating with and shifting in unison with the first signal valve, the second signal valve being in an off position when the first signal valve is in an on position whereby the second pneumatic signal is periodically accumulated between said signal valves and transmitted by said second signal valve when in an on position to produce a continuous pneumatic signal functional of the rate of vertical movement being monitored.

2. An apparatus for measuring the rate of movement as recited in claim 1, wherein said apparatus further includes a shutdown assembly responsive to said second pneumatic signal for selectively equalizing the pressure between the first and second chambers of the differential pressure transmitter, said shutdown assembly comprising:
    means in communication with said second pneumatic signal for transmitting a shutdown pneumatic signal upon said second pneumatic signal being outside a predetermined pressure range; and
    a control valve in communication with the timer valve and the transmitting means, said control valve shifting said differentiating valve in response to the shutdown pneumatic signal.

3. An apparatus for measuring the rate of vertical movement as recited in claim 2, wherein said transmitting means includes:
    a high scale relay in communication with said control valve and transmitting the shutdown signal upon said second pneumatic signal exceeding a predetermined pressure; and
    a low scale relay in communication with said control valve and transmitting the shutdown signal upon said second pneumatic signal being less than a predetermined pressure.

4. An apparatus for measuring the rate of movement of a kelly attached to the upper portion of a drill string with respect to the rig floor and producing an output signal indicative of the rate of penetration of a drill bit during drilling operations comprising:
    a flexible pipe having its upper portion carried by the kelly and its lower portion carried by the rig floor, the pipe containing a liquid whereby a liquid column is formed having a hydraulic pressure at its lower portion functional to the vertical distance between the kelly and the floor;
    a converter in communication with the pipe for sensing the hydraulic pressure and transmitting a first pneumatic signal functionally related to the hydraulic pressure;
    a differential pressure transmitter having a first and second chamber, the first chamber continually receiving the first pneumatic signal, the transmitter producing a second pneumatic signal functionally related to the pressure differential between the first and second chambers;
    a differentiating valve in communication with the second chamber for periodically equalizing the pressure between the first and second chambers;
    a timer valve in communication with and selectively shifting the differentiating valve whereby incremental changes in the pressure differential between the first and second chambers are functional of the rate of movement of the kelly and thus the rate of penetration of a drill bit; and
    a signal assembly in communication with the timer valve for transforming the second pneumatic signal characterized by a series of pneumatic pulses into a continuous pneumatic signal functional of the rate of penetration of the drill bit, said signal assembly including
    a first signal valve selectively interrupting the transmission of the second pneumatic signal by shifting between an on and off position in response to the output of the timer valve;

a second signal valve communicating with and shifting in unison with the first signal valve, the second signal valve being in an off position when the first signal valve is in an on position whereby the second pneumatic signal is periodically accumulated and transmitted by said second signal valve when in an on position to produce a continuous pneumatic signal functional of the rate of vertical movement being monitored;

an accumulator in communication with said first and second signal valves, said accumulator adapted for receiving the first pneumatic signal when the first signal valve is in an on position and for transmitting said first pneumatic signal when said second signal valve is in an on position.

5. An apparatus for measuring the rate of movement of a kelly as recited in claim 4, wherein said apparatus further includes a shutdown assembly responsive to said second pneumatic signal for selectively equalizing the pressure between the first and second chambers of the differential·pressure transmitter, said shutdown assembly comprising:

a high scale relay in communication with said second pneumatic signal for transmitting a shutdown pneumatic signal upon said second pneumatic signal exceeding a predetermined pressure;

a low scale relay in communication with said second pneumatic signal for transmitting a shutdown pneumatic signal upon said second pneumatic signal meeting less than a predetermined pressure; and a control valve in communication with the timer valve and the high scale and low scale relays, said control valve shifting said differentiating valve in response to the shutdown pneumatic signal.

6. An apparatus for measuring the rate of vertical movement as recited in claim 4, wherein said apparatus further includes a surge valve assembly in communication with said flexible pipe for regulating the hydraulic pressure to said converter, said surge valve assembly comprising:

a dampening valve connected to said pipe for dampening hydraulic pressure surges less than a predetermined amount in said flexible pipe, said surges being created by rapid movements of the kelly with respect to the rig floor; and means in communication with said pipe for allowing hydraulic pressure surges in excess of a predetermined amount to bypass said dampening valve.

* * * * *